(12) United States Patent
Prater et al.

(10) Patent No.: US 8,464,413 B1
(45) Date of Patent: Jun. 18, 2013

(54) ROBOT GEAR REDUCER REPLACING APPARATUS AND METHOD

(75) Inventors: Tom Prater, Marysville, OH (US); Mark Roop, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 733 days.

(21) Appl. No.: 12/614,230

(22) Filed: Nov. 6, 2009

(51) Int. Cl.
*B23P 19/00* (2006.01)
*B23P 19/04* (2006.01)

(52) U.S. Cl.
USPC ............ 29/426.1; 29/244; 29/271; 29/281.1; 29/281.4; 29/281.6; 29/426.3; 29/426.5

(58) Field of Classification Search
USPC .................. 29/244, 259, 260, 263, 264, 266, 29/270, 271, 281.1, 281.4, 281.6, 426.1, 29/426.3, 426.5, 898.08, 251, 252, 255
See application file for complete search history.

(56) References Cited

U.S. PATENT DOCUMENTS

| | | | | |
|---|---|---|---|---|
| 2,872,728 A * | 2/1959 | Fraser | ............................. | 29/256 |
| 3,146,522 A * | 9/1964 | Wright | ............................ | 29/256 |
| 4,210,990 A * | 7/1980 | Krieger | ........................... | 29/263 |
| 4,656,715 A * | 4/1987 | Diaz | ............................... | 29/259 |
| 4,688,313 A * | 8/1987 | Keller | ............................ | 29/238 |
| 4,771,528 A * | 9/1988 | Stromberg | ..................... | 29/259 |
| 4,965,921 A * | 10/1990 | Priest | ............................. | 29/254 |
| 5,333,378 A * | 8/1994 | Sjobom | ...................... | 29/898.08 |
| 5,349,736 A * | 9/1994 | Rubino et al. | ............... | 29/426.5 |
| 5,544,402 A * | 8/1996 | O'Neil | ............................. | 29/261 |
| 5,894,650 A * | 4/1999 | Barenburg | ..................... | 29/259 |
| 5,991,994 A * | 11/1999 | Crews | ............................. | 29/256 |
| 6,012,211 A * | 1/2000 | Ochoa et al. | ................. | 29/426.5 |
| 6,212,775 B1 * | 4/2001 | Sarver et al. | ............... | 29/898.08 |
| 6,502,293 B1 * | 1/2003 | Khurana | ...................... | 29/426.5 |
| 6,536,088 B1 * | 3/2003 | Chiang | ............................ | 29/255 |
| 6,581,265 B2 * | 6/2003 | Sawaya | ........................ | 29/426.5 |
| 7,155,802 B2 | 1/2007 | Cronk | | |
| 7,328,501 B2 | 2/2008 | Smiley et al. | | |
| 7,380,324 B2 * | 6/2008 | Young | ............................ | 29/259 |
| 2003/0037425 A1* | 2/2003 | Sawaya | ........................ | 29/426.5 |
| 2003/0070470 A1* | 4/2003 | Uegaki | ............................. | 72/705 |
| 2005/0086785 A1* | 4/2005 | Young | ........................... | 29/426.5 |
| 2009/0300896 A1* | 12/2009 | Ozzimo | .......................... | 29/267 |
| 2010/0095499 A1* | 4/2010 | Hung | ............................... | 29/252 |
| 2010/0115748 A1* | 5/2010 | Lin | ................................ | 29/259 |

* cited by examiner

*Primary Examiner* — Essama Omgba
(74) *Attorney, Agent, or Firm* — Rankin, Hill & Clark LLP (57) ABSTRACT

An apparatus for removing and installing a gear reducer from an assembly, such as a Fanuc robot, is provided. The apparatus includes a bracket that is attached to a casing of the robot in a vicinity of a position where the gear reducer is to be removed or installed. The bracket provides a sleeve that is disposed so as to be spaced from and aligned with the gear reducer when the bracket is mounted to the casing. A guide bearing is slidably received through the sleeve and has a first end that attaches to the gear reducer via an attachment assembly. The gear reducer can then be removed by pulling the guide bearing away from the robot or installed by pushing the guide bearing toward the robot.

22 Claims, 10 Drawing Sheets

ROBOT GEAR REDUCER REPLACING APPARATUS AND METHOD

BACKGROUND

The present disclosure relates to an apparatus for replacing a gear reducer, particularly to an apparatus and method for installing and removing a gear reducer from a robot (e.g., a Fanuc robot). Gear reducers are used in several assemblies to facilitate a transfer of energy from a motor to other components of the assembly. As with many mechanical components, the gear reducers may need to be removed and replaced, or simply removed for maintenance and/or cleaning. However, the gear reducer can be relatively heavy and/or large, making hand-held removal and proper installation difficult.

SUMMARY

According to one aspect, an apparatus for replacing a robot gear reducer mounted in a robot casing comprises a bracket, a sleeve provided on the bracket, a guide bearing, and an attachment member. The bracket is adapted to be attached to the robot casing and the sleeve is disposed on the bracket so as to be spaced from and aligned with the gear reducer when the bracket is attached to the robot casing. The guide bearing is slidably received in the sleeve and the attachment member can attach a first end of the guide bearing to the gear reducer. This can allow the gear reducer to be removed via sliding movement of the guide bearing.

According to another aspect, a method of replacing the gear reducer allows for the removal and installation or mounting of the gear reducer. The method for removing the gear reducer includes attaching the bracket to the robot casing, sliding the guide bearing through the sleeve, attaching a mounting plate to the first end of the guide bearing, attaching the mounting plate to the gear reducer, and then sliding the guide bearing away from the robot so as to remove gear reducer from the robot. The method for mounting the gear reducer includes attaching the bracket to the robot casing, attaching the gear reducer to a hanging assembly, raising the gear reducer using the handing assembly, sliding the guide bearing into the sleeve, attaching a mounting plate to the first end of the guide bearing, attaching the mounting plate to the gear reducer, and then sliding the guide bearing toward from the robot so as to install gear reducer in the robot.

DETAILED DESCRIPTION

A gear reducer replacing system and apparatus will be described herein with reference to the appended figures. In this regard, the description made with reference to the figures is so made to exemplify the system and apparatus disclosed herein. As such, the description with reference to the figures is not intended to limit the scope of the disclosure.

The gear reducer replacing apparatus, as described herein, is for both the removal of a gear reducer from an assembly and for the installation of a gear reducer into an assembly. In this vein, as used herein, the term "replace" is intended to imply either or both of a removal and installation of the gear reducer. Further, the gear reducer replacing apparatus is described herein with respect to the replacement of a Fanuc robot gear reducer. The description with reference thereto is provided to exemplify the apparatus, and should not be considered to limit the apparatus to such a use. Accordingly, it will be appreciated that the apparatus is amenable for use with various assemblies utilizing gear reducers, including, but not limited to, other robots.

Figure 1:
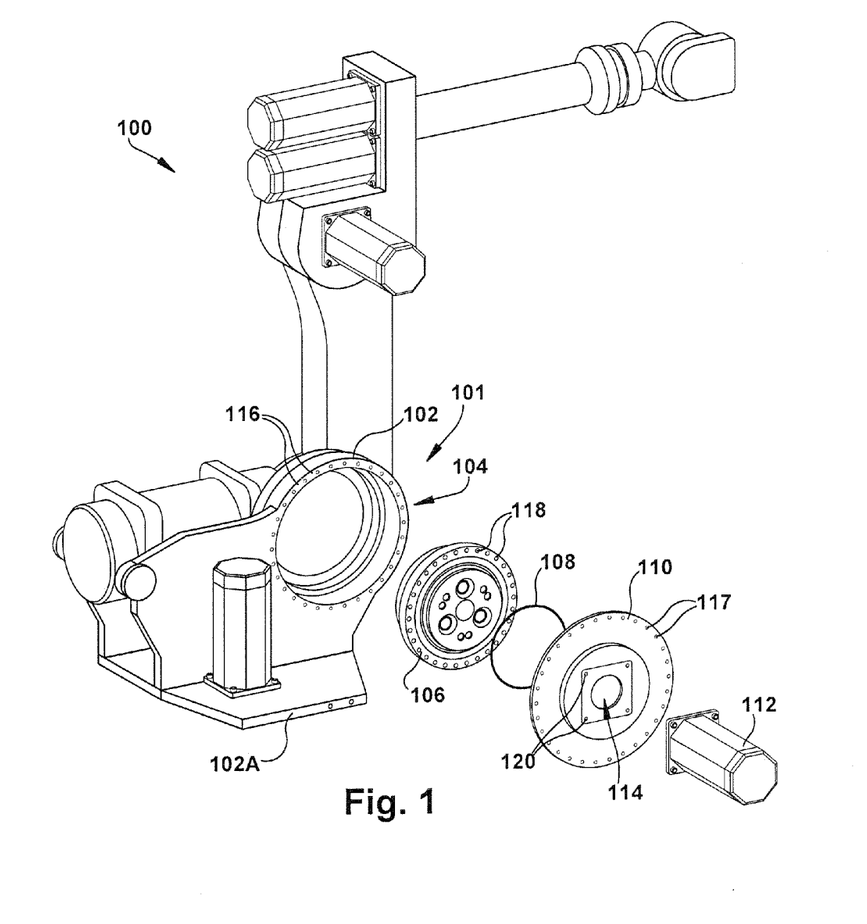
FIG. 1 is an exploded perspective view of a robot assembly including a gear reducer and motor.
Figure 2A:
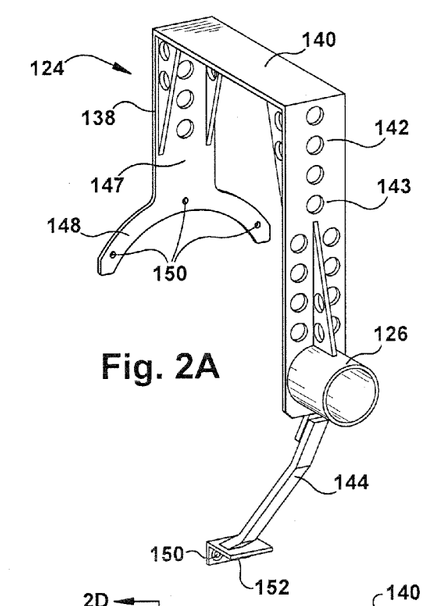
FIG. 2A is a perspective view of a bracket of a robot gear reducer replacing apparatus.
Figure 2B:
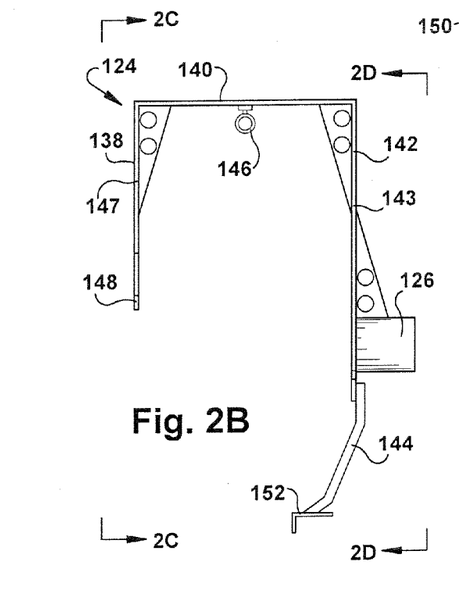
FIG. 2B is a front view of the bracket of the robot gear reducer replacing apparatus.
Figure 2C:
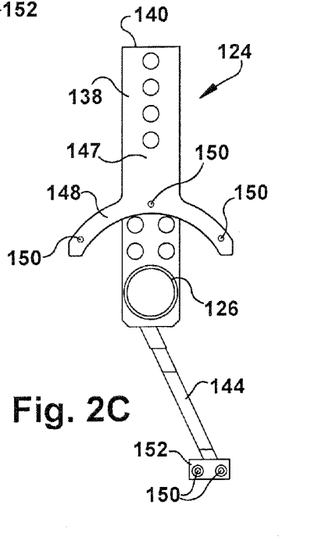
FIG. 2C is a first side view of the bracket of the robot gear reducer replacing apparatus shown along the line 2C-2C.
Figure 2D:
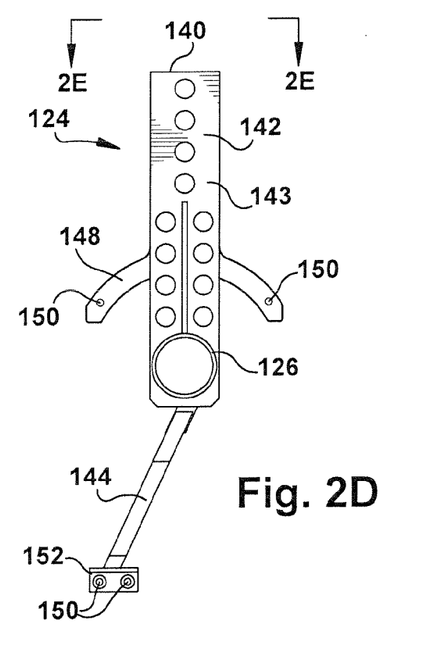
FIG. 2D is a second side view of the bracket of the robot gear reducer replacing apparatus shown along the line 2D-2D.
Figure 2E:
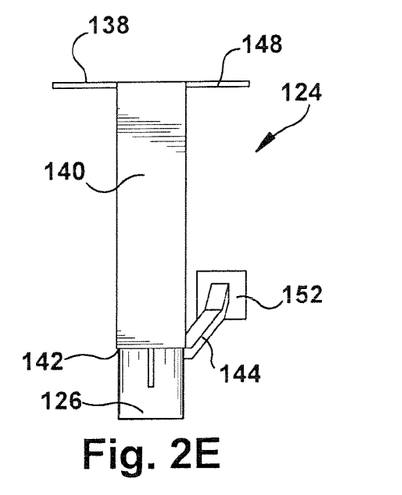
FIG. 2E is a plan view of the bracket of the robot gear reducer replacing apparatus.

FIG. 1 illustrates an exemplary Fanuc robot 100 (hereinafter, "robot 100") with reference to which the gear reducer replacing apparatus will be described. The components of the robot 100 will be described herein as being connected or attached to one another by being bolted, though other attaching or connecting mechanisms or means could be used.

The exemplary robot 100 described herein includes a rotatable base supporting a plurality of joints that allow for movement of a robot arm. In the vicinity of a first joint 101, the robot 100 includes a casing 102 that provides a mechanical opening 104, a gear reducer 106, an O-ring 108, a cover 110, and a motor 112. The description herein will focus on the robot first joint 101, though the other robot joints may have similar constructions and the disclosed apparatus is amenable for use therewith.

The casing 102 is the outer shell of the robot 100 that protects the internal mechanical and electrical elements (not illustrated). Typically, the casing 102 is formed of metal, though other materials could be used. The mechanical opening 104 is an opening formed in the casing 102 that allows access to the gear reducer 106 and other internal elements of the robot 100. Moreover, the mechanical opening 104 allows the motor 112, which is disposed outside of the casing 102 in the illustrated robot 100, to operably engage the gear reducer 106 so as to transfer energy to the gear reducer 106. As illustrated, the mechanical opening 104 is a generally circular opening that allows for the gear reducer 106 to pass therethrough so as to be mounted to the robot 100. In this regard, the mechanical opening 104 is defined by a generally circular peripheral edge that has a plurality of casing bolt openings 116 formed therein. However, it will be appreciated that the mechanical opening 104 can take other, non-circular shapes.

The exemplary gear reducer 106 described herein is a generally circular member that contains a plurality of interconnected gears. In this regard, as illustrated, the gear reducer 106 includes a pair of stacked plates having circular cross-sections. The plate of the gear reducer 106 that faces outwardly when installed in the robot 100 has a larger radius than the plate of the gear reducer 106 that faces inwardly when installed in the robot 100. Further, the gear reducer 106 has a central opening formed therein that allows for operable engagement with a drive shaft of the motor 112. A plurality of gear reducer bolt openings 118 are formed around a peripheral edge of the gear reducer 106 so as to allow the gear reducer 106 to be secured to the robot 100. Accordingly, in assembly, the gear reducer 106 is passed through the mechanical opening 104 and bolted to the robot 100 so as to operably engage the robot 100. To secure the attachment of the gear reducer 106 to the robot 100, the O-ring 108 is mounted in a channel formed on an outward-facing surface of the gear reducer 106.

To protect the gear reducer 106 and the other internal elements of the robot 100, the cover 110 is attached to the casing 102 so as to substantially close the mechanical opening 104. As illustrated, the cover 110 is a generally circular shaped plate member corresponding in size to the peripheral edge of the casing 102 that defines the mechanical opening 104. However, the cover 110 can take any shape so long as the mechanical opening 104 is covered thereby. A plurality of cover bolt openings 117 are formed around a peripheral edge of the cover 110. The cover bolt openings 117 are positioned to correspond with the casing bolt openings 116 formed around the peripheral edge of the mechanical opening 104, such that the cover 110 can be bolted to the casing 102.

Further, a motor opening 114 is formed in the cover 110. As illustrated, the motor opening 114 is a circular opening formed in a center of the cover 110, though the motor opening 114 can take a different shape. The motor opening 114 is surrounded by a plurality of motor receiving bolt openings 120 so the motor 112 can be mounted to the cover 110 by bolting. The motor opening 114 allows a drive shaft from the motor 112 to pass therethrough and operably engage the gear reducer 106 when the motor 114 is attached to the cover 110 while the cover 110 is attached to the casing 102.

Following certain time periods of use, it may become necessary to replace the gear reducer 106 (e.g., due to breakage, wear, end of useful life, etc.). With respect to replacing the gear reducer 106, it is noted that the gear reducer 106 can be relatively heavy and large so as to be difficult for hand-held movement by an operator. Further, the gear reducer 106 needs to be installed properly to the robot 100 so as to operably engage the robot internal elements, which can also be difficult by hand-held movement.

Figure 5A:
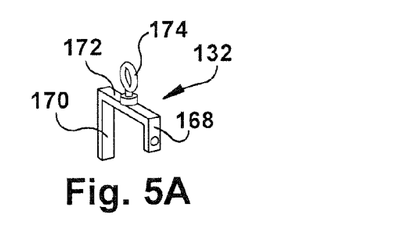
FIG. 5A is a perspective view of a yolk of the robot gear reducer replacing apparatus.
Figure 5B:
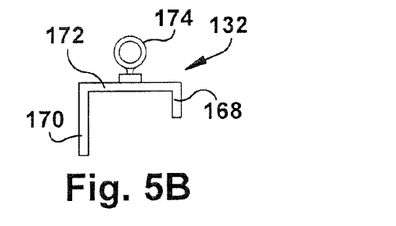
FIG. 5B is a front view of the yolk of the robot gear reducer replacing apparatus.
Figure 6:
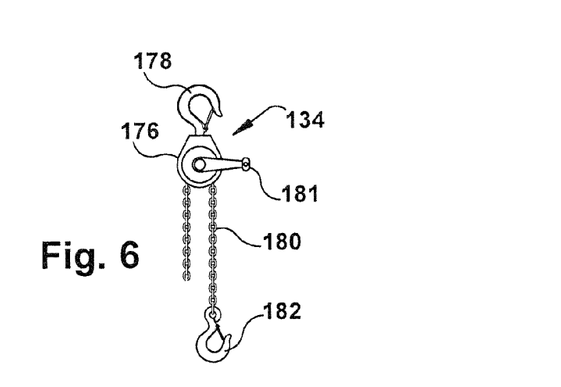
FIG. 6 is a front view of a lift ratchet of the robot gear reducer replacing apparatus.

With respect to the replacement of the gear reducer 106, the apparatus and method described herein focus primarily on the removal and installation of the gear reducer 106 in the robot 100 through the mechanical opening 104 formed in the casing 102. In the illustrated embodiment, a gear reducer replacing apparatus 122 (hereinafter, "apparatus", shown in FIGS. 8A-8I) includes a bracket 124 providing a sleeve 126 (FIGS. 2A-2E), a guide bearing 128 (FIGS. 3A-3B), a mounting plate 130 (FIGS. 4A-4B), a yolk 132 (FIGS. 5A-5B), and a lift ratchet 134 (FIG. 6). Additionally, tools for attaching and detaching components from each other and a gear reducer carrying tool 136 are provided.

As illustrated in FIGS. 2A-2E, the bracket 124 has a generally upside-down U-shape and includes a principal support arm 138 and a guide bearing support arm 142 attached to a gear reducer support arm 140. The sleeve 126 is provided on the guide bearing support arm 142. An auxiliary support arm 144 is attached to the guide bearing support arm 142 and an eye bolt 146 is attached to the gear reducer support arm 140. The principal support arm 138, the gear reducer support arm 140, and the guide bearing support arm 142 are all elongated plate members, with the principal support arm 138 and the guide bearing support arm 142 attached, at ends thereof, to opposite ends of the gear reducer support arm 140 so as to give the bracket 124 the upside-down U-shape.

In this regard, as illustrated and described herein, the principal support arm 138 and the guide bearing support arm 142 are vertically disposed and parallel to and spaced from one another, while the gear reducer support arm 140 is horizontally disposed and generally perpendicular to the principal support arm 138 and the guide bearing support arm 142. References made to vertical and horizontal dispositions are made only insofar as the bracket 124 is so situated in the drawings. Such references are not meant to be limiting of the structure of the bracket 124. Further, the bracket 124 need not necessarily have an upside-down U-shape, the principal support arm 138 need not be parallel to and spaced from the guide bearing support arm 142, and the gear reducer support arm 140 need not be perpendicularly disposed relative to the principal support arm 138 and the guide bearing support arm 142. Rather, the illustrated construction of the bracket 124 is exemplary and can be changed and altered while remaining within the scope of disclosure.

With further reference to the principal support arm 138, the principal support arm 138 is attachable to the casing 102. For this purpose, the principal support arm 138 includes a principal shaft 147 and an arcuate leg 148 symmetrically provided at a distal end of the principal shaft 147 spaced from the gear reducer support arm 140. An end of the principal shaft 147 opposite from the arcuate leg 148 is connected to the gear reducer support arm 140.

The arcuate leg 148 defines an arc along a radius that can substantially or nearly match an arc formed by the casing 102 around the periphery of the mechanical opening 104, and can be attached to the distal end of the principal shaft 147 at a central point of the arcuate leg 148 so as to symmetrically extend from the principal shaft 147. Further, a plurality of principal support arm bolt openings 150 are formed in the arcuate leg 148. As will be appreciated with reference to the below description, the principal support arm bolt openings 150 are provided so as to be alignable with the casing bolt openings 116 used to secure the cover 110 to the casing 102. Accordingly, the bracket principal support arm 138 can be attached to existing structures of the casing 102 without necessitating any special assembly or modification of the casing 102.

With further reference to the guide bearing support arm 142, the guide bearing support arm 142 includes a guide shaft 143 that has a length greater than that of the principal shaft 147. In the vicinity of a distal end of the guide shaft 143, the sleeve 126 is provided so as to extend orthogonally through the guide shaft 143. As such, the sleeve 126 is spaced from the gear reducer support arm 140 a distance that is greater than the distance between the gear reducer support arm 140 and the intersection of the principal shaft 147 and the arcuate leg 148 of the principal support arm 138. Accordingly, by having a length of the guide shaft 143 set to be greater than a length of the principal shaft 147, the principal support arm 138 can be attached to the casing 102 at a position above the mechanical opening 104 while the sleeve 126 is spaced from and aligned with (or coaxial with) the gear reducer 106.

The sleeve 126 is a hollow member that is provided on the guide bearing support arm 142 so as to pass through the guide shaft 143. Particularly, as illustrated, the sleeve is a hollow annular or tubular body with an inner passage having an axis that extends orthogonally to the guide shaft 143 so as to be horizontally disposed. In this regard, the sleeve 126 has a circular cross section on both an outer surface and an inner surface. A first portion of the sleeve 126 is disposed between the guide shaft 143 and the principal support arm 138, a second portion of the sleeve 126 passes through the guide shaft 143, and a third portion of the sleeve 126 extends away from the guide shaft 143 and the principal support arm 138. As illustrated, the first portion of the sleeve 126 has a length greater than that of the third portion of the sleeve 126.

The sleeve 126 is provided so as to be aligned with the gear reducer 106. As used herein, the term aligned means that the body of the sleeve 126 is level with a surface of the gear reducer 106 such that the axis of the sleeve 126 intersects the gear reducer 106. As illustrated, the axis of the sleeve can align with a center point of the gear reducer 106 so as to be coaxial therewith.

As will be discussed in further detail below, the sleeve 126 receives the guide bearing 128 (FIGS. 3A-3B), which attaches to the gear reducer 106. Accordingly, the sleeve 126 is provided with a length and strength sufficient to stably support both the guide bearing 128 and the gear reducer 106 through a range of possible sliding motion of the guide bearing 128 and gear reducer 106. Further, though the sleeve 126 is illustrated as having a tubular shape, which is advantageous, the sleeve 126 is amenable to various shapes, both with reference to an inner shape and an outer shape. Further still, the shape of the cross section of the inner surface need not be the same as that of the outer surface. As an example, the outer surface can have a rectangular cross section while the inner surface has a circular cross section. Further, the proportions of the first and third portions of the sleeve 126 relative to the guide shaft 143 can be adjusted as desired.

As mentioned above, the gear reducer support arm 140 extends between and connects the principal support arm 138 and the guide bearing support arm 142. With reference to the bracket 124 having an upside-down or inverted U-shape, the gear reducer support arm 140 is the upper, horizontal arm shown in the figures. As with the principal support arm 138 and the guide bearing support arm 142, the gear reducer support arm 140 is a plate member.

At a substantially central position of the gear reducer support arm 140, the eye bolt 146 (FIG. 2B) is attached so as to extend in downward direction (same direction as the principal support arm 138 and the guide bearing support arm 142). The eye bolt 146 has an annular member that is connected to an under-surface of the gear reducer support arm 140 by a leg. The leg is attached to the gear reducer support arm 140 so as to allow the gear reducer 106 to hang from the bracket 124 via the eye bolt 146, as will be described in further detail below.

In addition to the principal support arm 138 being attachable to the casing 102, the auxiliary support arm 144 extends from the guide bearing support arm 142 and is also attachable to the casing 102. Accordingly, the auxiliary support arm 144 aids in stabilizing the bracket 124 when the bracket 124 is attached to the casing 102. The auxiliary support arm 144 is attached to the guide bearing support arm 142 in the vicinity of the sleeve 126, such that the sleeve 126 is disposed between the attachment point of the guide bearing support arm 142 and the auxiliary support arm 144 and the gear reducer support arm 140.

From the attachment point between the auxiliary support arm 144 and the guide bearing support arm 142, the auxiliary support arm 144 extends outwardly and then curves, at an elbow, toward the principal support arm 138. At a distal end of the auxiliary support arm 144, a L-plate 152 having bolt openings 150 formed therethrough is provided for securing the auxiliary support arm 144 to a casing ledge 102A. As will be appreciated with reference to the below description, the auxiliary support arm 144 is configured so as to extend from the guide bearing support arm 142 to the casing ledge 102A such that the auxiliary support arm bolt openings 150 in the L-plate 152 are aligned or in registry with existing bolt openings in the casing ledge 102A. Accordingly, the auxiliary support arm 144 can be bolted to the casing ledge 102A without needing any special securing structures. Further, the auxiliary support arm 144 can be configured so as to attach to any portion of the casing 102, though the auxiliary support arm 144 can attach to the casing 102 at a position that is below the arcuate leg 148.

Figure 3A:
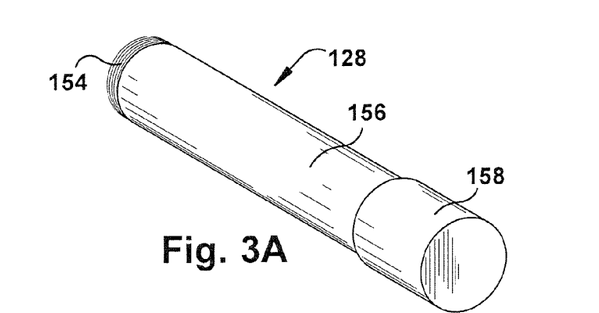
FIG. 3A is a perspective view of a guide bearing of the robot gear reducer replacing apparatus.
Figure 3B:
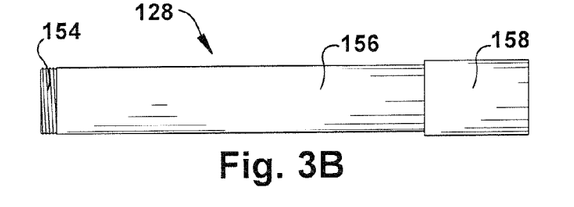
FIG. 3B is a front view of the guide bearing of the robot gear reducer replacing apparatus.

As illustrated in FIGS. 3A and 3B, the guide bearing 128 is a cylindrical shaft, which can be formed of metal, though other rigid materials may be substituted. The guide bearing 128 includes a first end 154, a main body 156, and a second wide end 158. The first end 154 is threaded along the outside surface and has a radius that is less than or equal to that of the main body 156, which, in turn, has a radius that is less than or equal to that of the second wide end 158. Moreover, the radius of the main body 156 is less than that of the inner surface of the sleeve 126, though the difference can be minimal, while the radius of the wide second end 158 can be greater than that of the main body 156 and the inner surface of the sleeve 126 to limit axial insertion thereinto.

As with the shape of the sleeve 126, the guide bearing 128 need not be a cylindrical shaft. The guide bearing 128 need only be shaped such that the main body 156 fits through the sleeve 126, though the shape of the guide bearing 128 can correspond to the shape of the inner surface of the sleeve 126. As an example, the guide bearing 128 can be an elongated guide having a rectangular or other shaped cross section that is sized to fit through the passage defined by the sleeve. However, as will be appreciated with reference to the description below, a cylindrical shaped guide bearing 128 allows for rotation of the guide bearing 128 within the sleeve 126, and thereby facilitates operation of the apparatus 122.

Figure 4A:
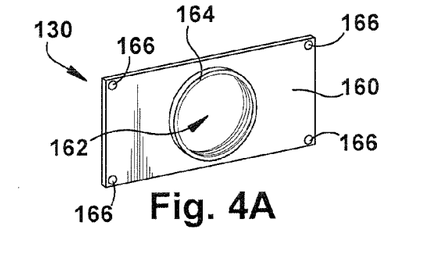
FIG. 4A is a perspective view of a mounting plate of the robot gear reducer replacing apparatus.
Figure 4B:
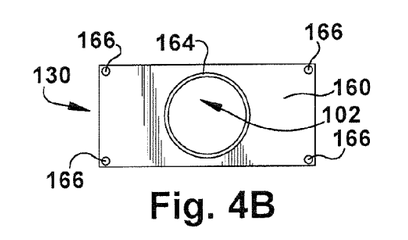
FIG. 4B is a front view of the mounting plate of the robot gear reducer replacing apparatus.
Figure 4C:
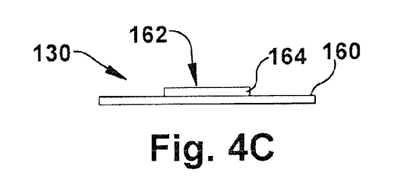
FIG. 4C is a plan view of the mounting plate of the robot gear reducer replacing apparatus.

As illustrated in FIGS. 4A-4C, the mounting plate 130 (an attachment member) can be a plate (e.g., formed of metal) that includes a planar body 160, a guide bearing securing opening 162, a threaded spacer 164, and a plurality of mounting plate bolt openings 166. The guide bearing securing opening 162 and the threaded spacer 164 form a guide bearing securing portion for attaching to the guide bearing first end 154. The plurality of mounting plate bolt openings 166 are a gear reducer securing portion.

As illustrated, the planar body 160 has a rectangular shape with a pair of opposed faces, and the guide bearing securing opening 162 is a circular opening that is provided in a central position of the planar body 160 with the threaded spacer 164 projecting orthogonally therefrom. The threaded spacer 164 has an annular shape and forms an elevated ridge from one face of the planar body 160, and is threaded on an inner surface thereof such that the threaded spacer 164 and inner edges defining the guide bearing securing opening 162 cooperate to define a threaded inner surface. The inner radius of the threaded spacer 164 and the guide bearing securing opening 162 is set so as to allow for threaded engagement with the threaded first end 154 of the guide bearing 128.

The mounting plate bolt openings 166 are bolt openings positioned such that, when the mounting plate face (a second face shown in FIG. 4B) opposite the face from which the threaded spacer 164 projects (a first face shown in FIG. 4A) is flush against the gear reducer 106, the mounting plate bolt openings 166 can be aligned with existing gear reducer bolt openings 118. As will be discussed below, the mounting plate 130 is attached to the guide bearing 128. Accordingly, the mounting plate bolt openings 166 are alignable with the gear reducer bolt openings 118 when the mounting plate 130 is attached to the guide bearing 128 in the manner described below. Further in this regard, the mounting plate planar body 160 is sized so as to allow the mounting plate bolt openings 166 to be alignable with the gear reducer bolt openings 118. In other words, the mounting plate planar body 160 can be sized such that edges thereof are long enough to connect opposed points disposed on a circumference of the gear reducer 106.

In combination with the bracket eye bolt 146, the yolk 132 and the lift ratchet 134 will be described hereinbelow as a hanging assembly. As illustrated in FIGS. 5A and 5B, the yolk 132 includes a first arm 168 and a second arm 170 interconnected by a support arm 172 so as to form an upside-down U-shape. In this regard, the first arm 168 is shorter than the second arm 170, and both arms have bolt openings formed through lower ends thereof so as to be bolted to the gear reducer 106, as will be described below. In this regard, the different arm lengths are sized to allow the yolk 132 to be attached to the gear reducer 106 opposite faces of the gear reducer 106, each of which is defined by one of the differently sized stacked plates. The yolk 132 further includes a yolk eye bolt 174 that projects from the yolk support arm 172 in a direction opposed to that of the first and second arms 168, 170.

As illustrated in FIG. 6, the lift ratchet 134 includes a main body 176 attached to a bracket engaging hook 178, a chain 180, and a lever 181. Further, a yolk engaging hook 182 is attached to an end of the chain 180. The main body 176 serves as a casing for holding the lever 181 and the chain 180. The bracket engaging hook 178 is attached to a top portion of the main body 176 and is disposed so as to be engaged with the bracket eye bolt 146. The yolk engaging hook 182 attached to the chain 180 is attached to the chain so as to engage with the yolk eye bolt 174 attached to the gear reducer 106. Accordingly, the lift ratchet 134 is configured so as to secure the gear reducer 106 and yolk 132 to the bracket eye bolt 146.

The chain 180 passes through a pulley disposed within the main body 176, and is in operable engagement with the lever 181. The lever 181 operably engages the chain 180 so as to feed (or pay) out or reel in the chain 180, thereby either increasing the amount of chain 180 between the main body 176 and the yolk engaging hook 182 (lowering) or decreasing the amount of chain 180 between the main body 176 and the yolk engaging hook 182 (raising). Specifically, rotation of the lever 181 causes the pulley to similarly rotate, thereby either feeding out or reeling in the chain 180. Accordingly, as will be appreciated with reference to the below description, the lift ratchet 134 is operable to raise and lower the gear reducer 106 when attached to the bracket 124. It will be appreciated that any mechanism capable of raising and lowering the gear reducer 106 relative to the bracket 124 can be used in place of the lift ratchet 134.

Figure 7:
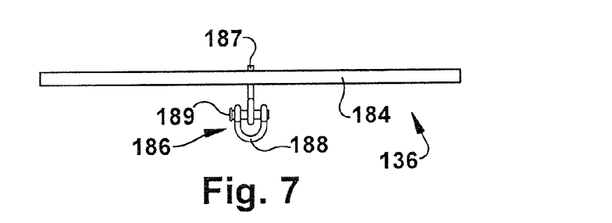
FIG. 7 is a front view of a gear reducer carrying tool.

The elements of the apparatus 122 described above can be used to replace the gear reducer 106 of the robot 100. Once the gear reducer 106 is removed therefrom, the gear reducer 106 can be moved away from the robot 100. Conversely, when a gear reducer 106 is to be installed into the robot 100, the gear reducer 106 may need to be carried to the robot 100. Accordingly, as illustrated in FIG. 7, the gear reducer carrying tool 136 is provided.

The gear reducer carrying tool 136 includes a main bar 184 attached to a gear reducer supporting assembly 186. The main bar 184 is an elongated rod member, and the gear reducer supporting assembly 186 is attached to a substantially center point of the main bar 184. The gear reducer support assembly 186 includes a support bolt 187 that passes through the main bar 184 and has an opening at a bottom end thereof and a U-shaped support member 188 having circular openings formed at ends of an arm that defines the U-shape. The arm that defines the U-shaped support member 188 is sized to fit in the yolk eye bolt 174. The U-shaped support member 188 and the support bolt 187 are locked together by a locking bolt 189 that fits through the opening in the support bolt 187 and the openings formed in the ends of the arm defining the U-shaped support member 188. The gear reducer supporting assembly 186 is sized and shaped so as to engage the yolk eye bolt 174 by having the arm of the U-shaped support member 188 pass through the yolk. It will again be appreciated the gear reducer carrying tool 136 described herein is merely an exemplary gear reducer carrying tool. Various alternatives can be utilized.

As the components of the apparatus 122 have been described, the operation of the apparatus 122 will now be described with reference to FIGS. 8A-8J and 9. In this regard, the apparatus 122 will initially be described with respect to the removal of the gear reducer 106 from the robot 100, and followed by the installation of the gear reducer 106 into the robot 100.

Prior to beginning a gear reducer 106 removal operation, the robot 100 initially has the gear reducer 106 and O-ring 108 mounted thereto within the mechanical opening 104 of the casing 102. The mechanical opening 104 is covered by the cover 110 that is bolted to the casing 102, and the motor 112 is bolted to the cover 110 so as to operably engage the gear reducer 106 through the cover motor opening 114.

Accordingly, an initial step of removing the gear reducer 106 is to expose and prepare the gear reducer 106 for removal. More specifically, the motor 112 must first be removed by removing the bolts attaching the motor 112 to the cover 110. Once the bolts are removed, the motor 112 is released from the cover 110 and can then be pulled from the robot 100.

Following removal of the motor 112, the bolts holding the cover 110 to the casing 102 are removed so as to release the cover 110, and the cover 110 is similarly removed. At this point, the mechanical opening 104 is uncovered and the gear reducer 106 is exposed. The bolts securing the gear reducer 106 to the robot 100 are then removed so as to release the gear reducer 106, which is then prepared for removal.

Figure 8A:
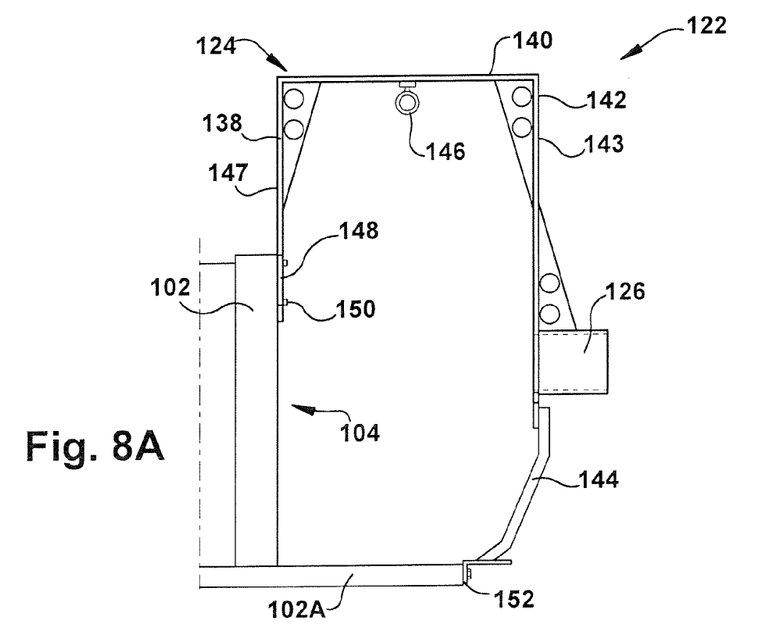
FIG. 8A is a front view of the gear reducer replacing apparatus shown with the bracket attached to the robot casing.

Following the exposure and preparation of the gear reducer 106 for removal, the bracket 124 is attached to the casing 102, as shown in FIG. 8A. Particularly, the bracket 124 is bolted to the casing 102 using the existing casing bolt openings 116. To bolt the bracket 124 to the casing 102, the bracket 124 is first lifted into position such that the principal support arm 138, at least at the arcuate leg 148, is flush against the casing 102 in a position above the mechanical opening 104. Herein, the bracket principal support arm arcuate leg 148 is placed flush against the casing 102 around the periphery of the mechanical opening 104. The bolt openings 150 formed in the principal support arm arcuate leg 148 are then aligned with the casing bolt openings 116, and the principal support arm arcuate leg 148 is bolted to the casing 102.

To further support the bracket 124, the auxiliary support arm 144 is then also attached to the casing 102 via bolting. Specifically, the plate 152 provided on the distal end of the auxiliary support arm 144 is aligned with the casing ledge 102A such that bolt openings 150 in the plate 152 are aligned with existing bolt openings in the casing ledge 102A. The plate 152 is then bolted to the casing ledge 102A so as to attach the auxiliary support arm 144 to the casing ledge 102A.

At this point, the bracket 124 is securely bolted to the casing 102. As attached to the casing 102, the sleeve 126 is spaced from and aligned with the gear reducer 106. Then, in a step illustrated in FIG. 8B, the guide bearing 128 is passed through the sleeve 126. Particularly, the guide bearing first end 154 is first passed through the sleeve 126 and is slidingly moved toward the gear reducer 106. The guide bearing second end 158, being wider than the guide bearing main body 156 and the inner surface of the sleeve 126, can serve as a stopper to prevent excessive movement of the guide bearing first end 154 toward the gear reducer 106 and the robot 100.

Figure 8B:
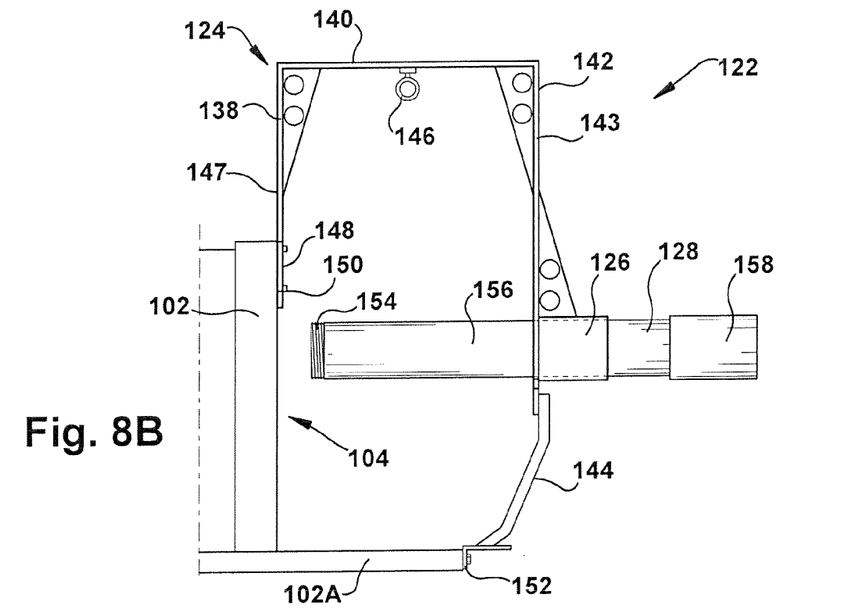
FIG. 8B is a front view of the gear reducer replacing apparatus shown with the bracket attached to the robot casing and with the guide bearing received in a sleeve of the bracket.
Figure 8C:
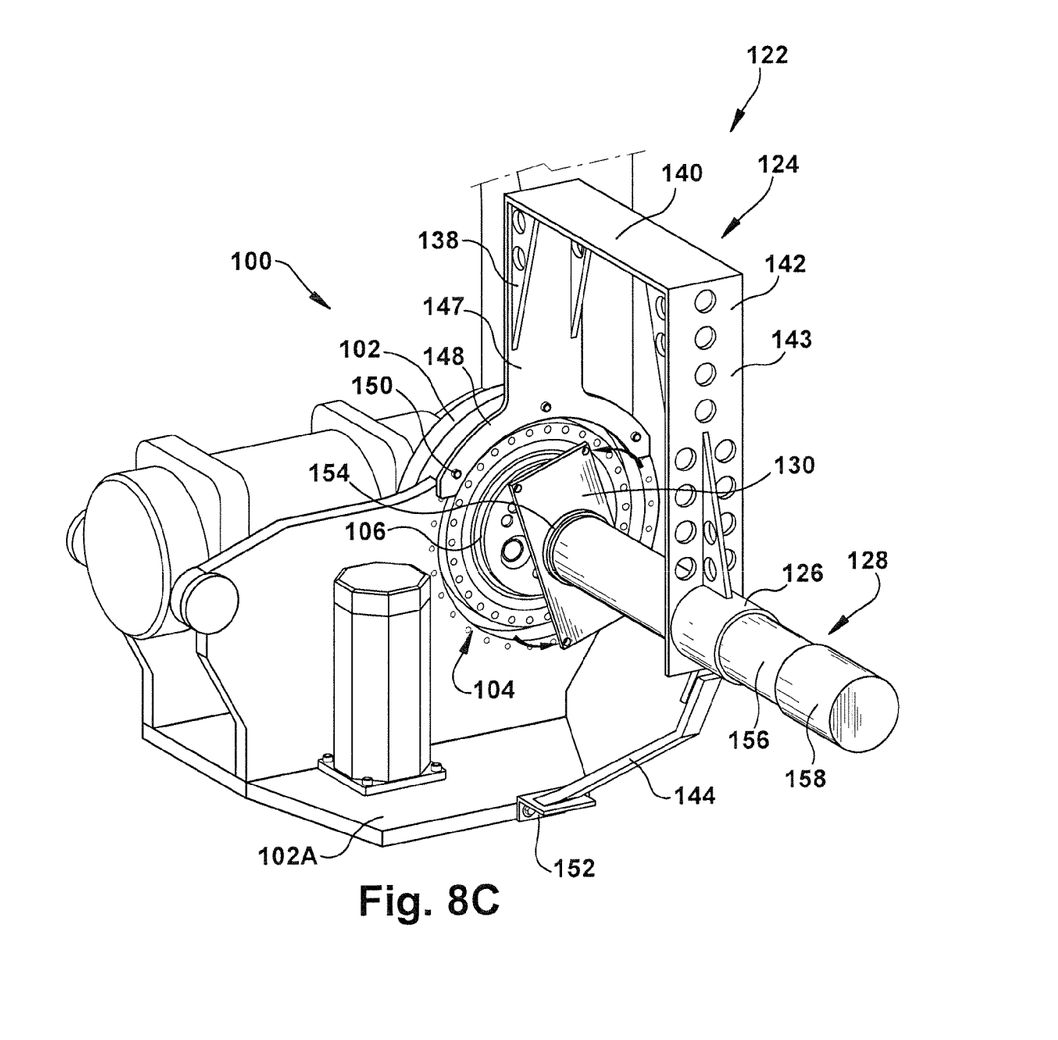
FIG. 8C is a perspective view of the gear reducer replacing apparatus illustrating the mounting plate being attached to the guide bearing.

Once the guide bearing 128 is received in the sleeve 126 such that the first end 154 of the guide bearing 128 is adjacent to the gear reducer 106, the mounting plate 130 is attached to the guide bearing 128. Specifically, the threaded first end 154 of the guide bearing 128 is threaded with the mounting plate threaded spacer 164. Accordingly, the guide bearing 128 is in threaded engagement with the mounting plate 130, as shown in FIG. 8C. The guide bearing 128 is now operable to move the mounting plate 130 toward or away from the robot 100 and the gear reducer 106.

Figure 8D:
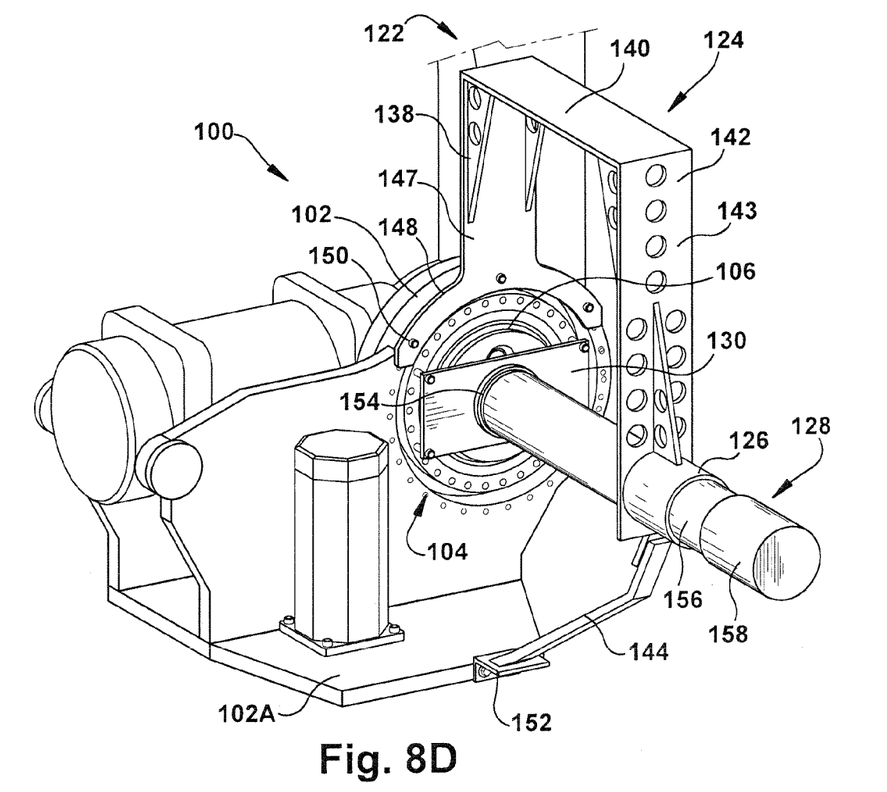
FIG. 8D is a perspective view of the gear reducer replacing apparatus illustrating the mounting plate attached to the gear reducer.
Figure 8E:
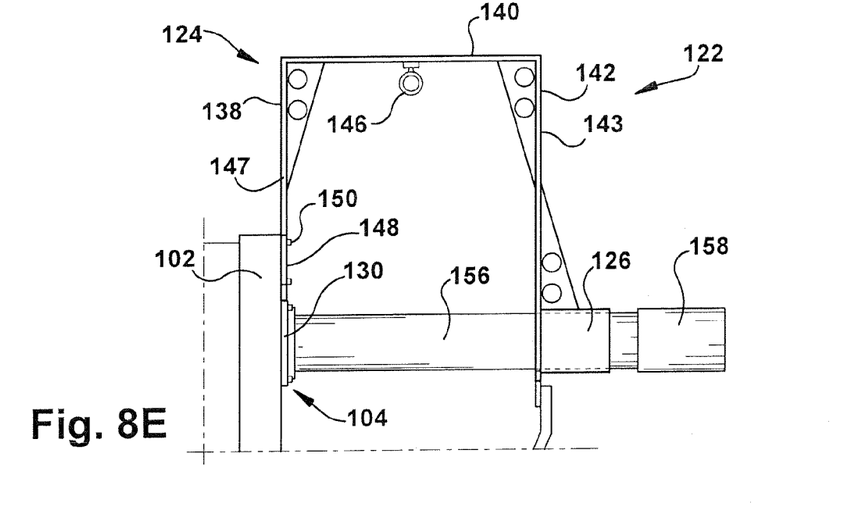
FIG. 8E is a front view of the gear reducer replacing apparatus with the mounting plate attached to the gear reducer.

The next step involves attaching the mounting plate 130 to the gear reducer 106. For this, the guide bearing 128 is pushed so that the guide bearing first end 154, to which the mounting plate 130 is attached, is moved toward the gear reducer 106 until the mounting plate 130 is in contact with the gear reducer 106. The guide bearing 128 is then rotated until the mounting plate bolt openings 166 are aligned with the gear reducer bolt openings 118. Once aligned, the mounting plate 130 is bolted to the gear reducer 106, as shown in FIGS. 8D and 8E.

Figure 8F:
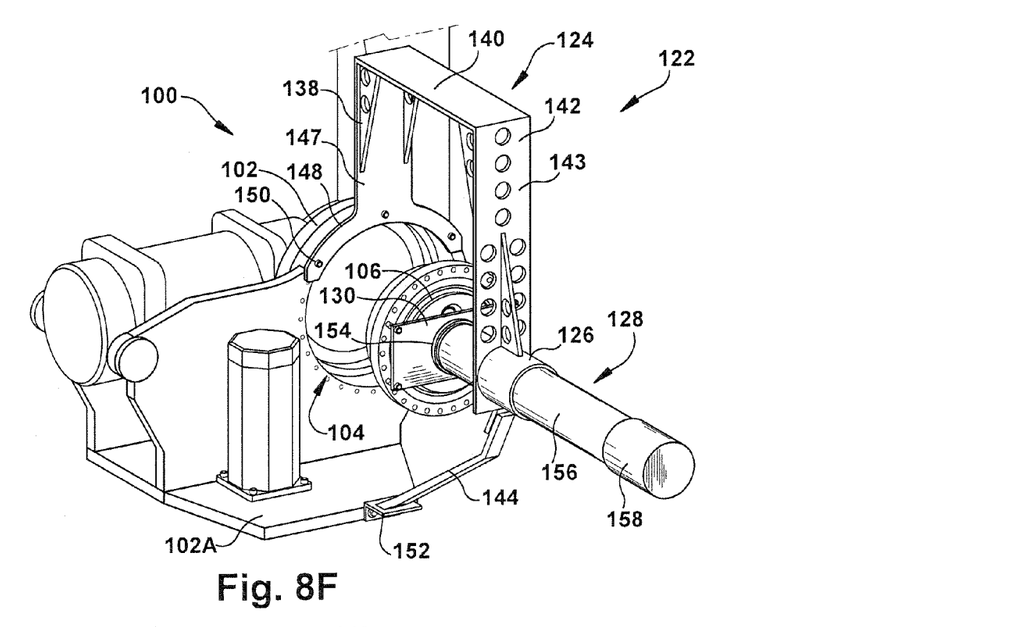
FIG. 8F is a front view of the gear reducer replacing apparatus supporting the gear reducer with the guide bearing and mounting plate while the gear reducer is removed from the robot casing.

At this point, the gear reducer 106, the mounting plate 130, and the guide bearing 128 are integrally attached to one another such that the gear reducer 106 can be removed from the robot 100 by pulling the guide bearing 128 away from the robot 100. In removing the gear reducer 106, the operator can grasp the guide bearing second end 158 and pull the guide bearing first end 154 away from the robot 100. As the gear reducer 106 is attached to the guide bearing first end 154 through the mounting plate 130, the movement of the guide bearing 128 away from the robot 100 causes the gear reducer 106 to be pulled out of engagement with the robot 100. This is shown in FIG. 8F.

Figure 8G:
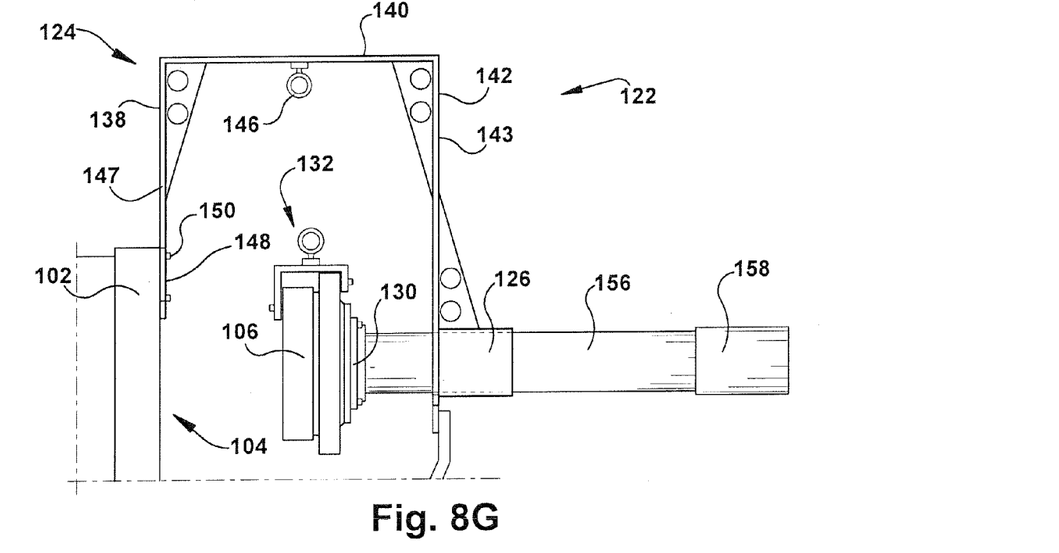
FIG. 8G is a front view of the gear reducer replacing apparatus with the yolk attached to the gear reducer.

The gear reducer 106, while being supported by the mounting plate 130 and the guide bearing 128 held in the bracket 124, has the yolk 132 attached thereto. Specifically, the yolk 132 is attached to the gear reducer by being bolted through the existing gear reducer bolt openings 118. In this regard, the yolk first arm 168 is bolted to one face of the gear reducer 106 and the yolk second arm 170 is bolted to a second face of the gear reducer 106 such that the yolk support arm 172 is disposed above the gear reducer 106, as shown in FIG. 8G. It is noted that the uneven lengths of the yolk first and second arms 168, 170 allow the yolk 132 to be attached to the uneven plates forming the gear reducer 106.

Figure 8H:
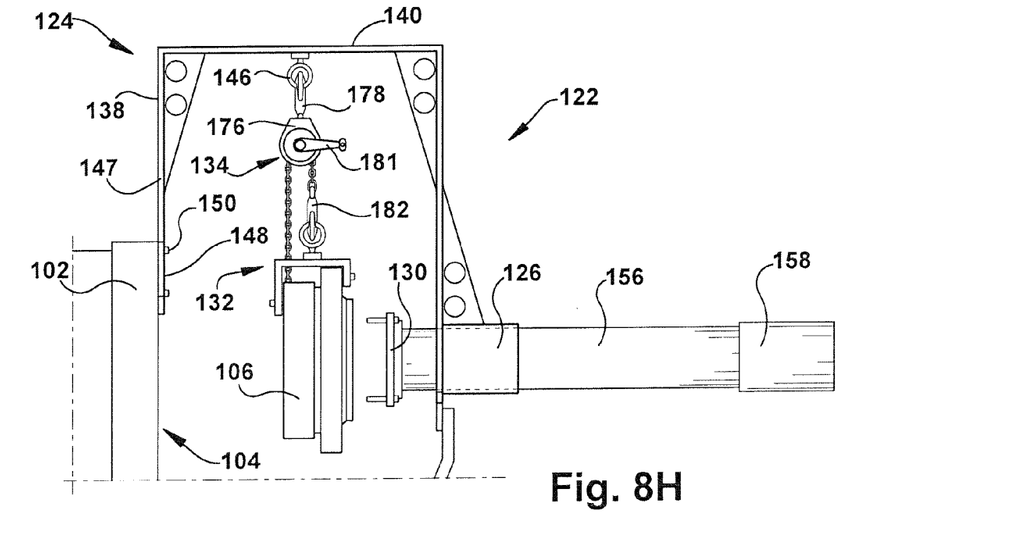
FIG. 8H is a front view of the gear reducer replacing apparatus with the lift ratchet attached to the bracket and supporting the gear reducer.

In the next step, shown in FIG. 8H, the lift ratchet 134 is installed between the bracket 124 and the yolk 132. Particularly, the lift ratchet bracket engaging hook 178 is engaged with the bracket eye bolt 146 so as to hang therefrom. Then, the lift ratchet yolk engaging hook 134 is engaged with the yolk eye bolt 174 such that the yolk 132 and the gear reducer 106 hang from the lift ratchet chain 180 that is engaged with the lift ratchet main body 176.

The bolts attaching the mounting plate 130 to the gear reducer 106 are then removed so as to detach the mounting plate 130 from the gear reducer 106, and the mounting plate 130 and the gear reducer 106 are separated. The guide bearing 128 is then pulled in a direction away from the robot 100, thereby removing the mounting plate 130 and guide bearing 128 from the gear reducer 106. Accordingly, the gear reducer 106 is left hanging from the bracket eye bolt 146 and the lift ratchet 134, as also shown in FIG. 8H.

Figure 8I:
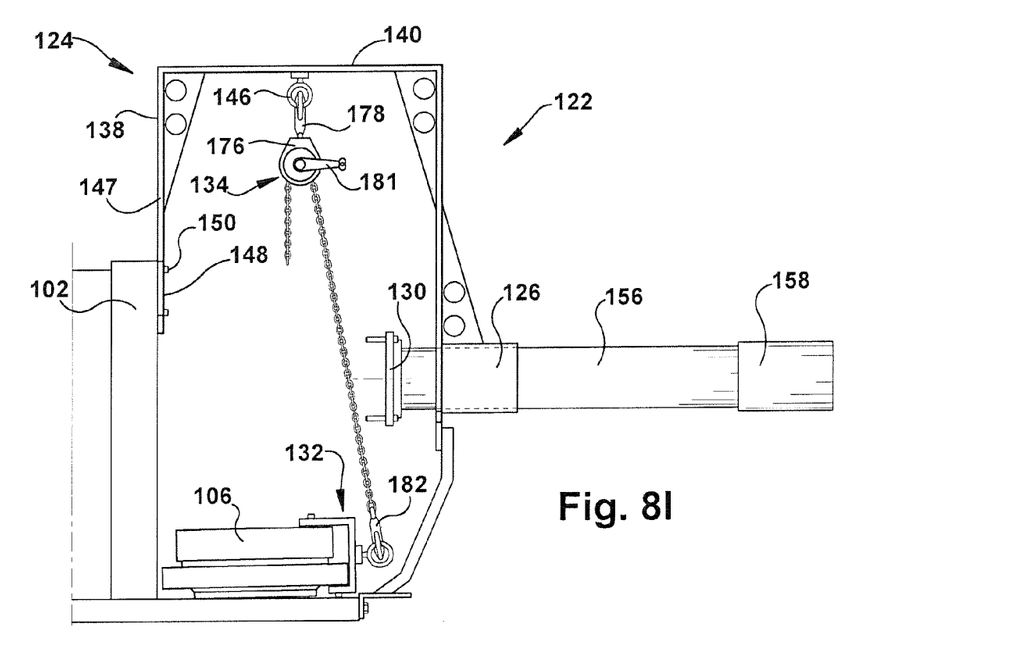
FIG. 8I is a front view of the gear reducer replacing apparatus with the gear reducer lowered by the lift ratchet.

The lift ratchet 134 is operable to raise and lower the gear reducer 106 through operation of the lever 181. Accordingly, the lift ratchet 134 is operable to allow the chain length between the main body 176 and the gear reducer 106 to elongate, thereby lowering the gear reducer 106 from the bracket 124 to a vicinity of the ground, as shown in FIG. 8I. This is accomplished by rotation of the lever 181 about its pivot point on the main body 176.

Figure 9:
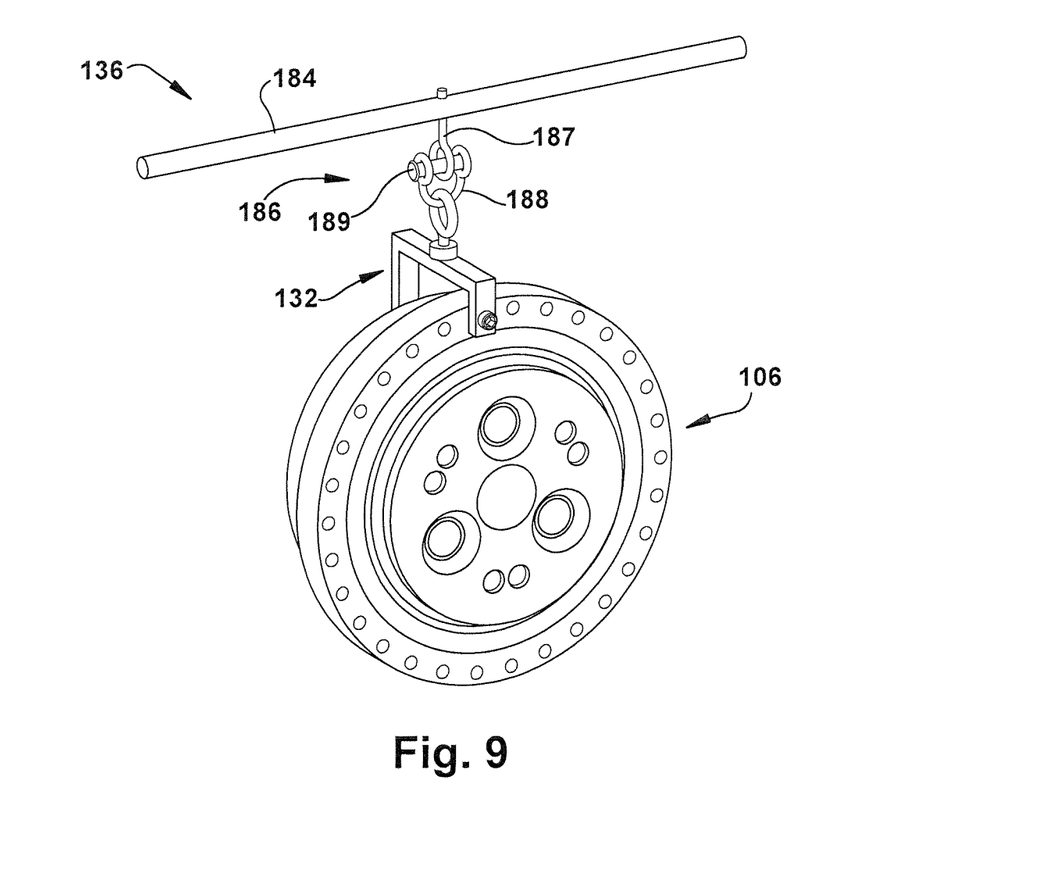
FIG. 9 is a front view of the gear reducer carrying tool supporting the gear reducer.

Once lowered to the ground, the gear reducer 106 can be detached from the lift ratchet engaging hook 182 and attached to the gear reducer carrying tool 136. Specifically, the gear reducer carrying tool support assembly 186 is threaded with and secured to the yolk 132 attached to the gear reducer 106, as shown in FIG. 9. The operator can then lift the main bar 184 so as to carry the gear reducer 106.

The installation of the gear reducer 106 into the robot 100 reverses several of the steps from above. Specifically, a gear reducer 106 having a yolk 132 attached thereto is carried to the robot 100 using the gear reducer carrying tool 136. Meanwhile, the bracket 124 is bolted to the casing 102 (as shown in FIG. 8A), the guide bearing 128 is received in the sleeve 126 (as shown in FIG. 8B), the mounting plate 130 is attached to the guide bearing first end 154 (as shown in FIG. 8C), and the lift ratchet bracket engaging hook 178 is attached to the bracket eye bolt 146 (as shown in FIG. 8H).

The gear reducer carrying tool 136 is then released from the yolk 132, and the lift ratchet yolk engaging hook 182 is attached to the yolk 132 (as shown in FIG. 8I). The lever 181 of the lift ratchet 134 is then rotated so as to cause the lift ratchet 134 to lift the gear reducer 106 by reducing the amount of chain 180 between the lift ratchet main body 176 and the gear reducer 106. The gear reducer 106 is lifted until aligned with the sleeve 126 and the guide bearing 128, as shown in FIG. 8H.

The mounting plate 130 is then attached to the gear reducer 106, as described above. As the gear reducer 106 is now held by the bracket 124, the guide bearing 128, and the mounting plate 130, the lift ratchet 134 can be removed. In particular, the lift ratchet yolk engaging hook 182 is detached from the yolk 132 and the lift ratchet bracket engaging hook 178 is detached from the bracket eye bolt 146. Further, the yolk 132 is detached from the gear reducer 106. Accordingly, the apparatus 122 is in a state shown in FIG. 8F.

The guide bearing 128 is then pushed toward the robot 100 so that the gear reducer 106, attached to the guide bearing first end 154 via the mounting plate 130, is inserted into the mechanical opening 104 formed in the casing 102 and placed in engagement with the robot 100 (as shown in FIGS. 8D and 8E). The mounting plate 130 is then detached from the gear reducer 106 and the guide bearing 128 (as shown in FIG. 8B), the guide bearing 128 is removed from the sleeve 126 (as shown in FIG. 8A), and the bracket 124 is detached from the casing 102 (as shown in FIG. 1). Finally, the gear reducer 106 is bolted to the robot 100, the O-ring 108 is installed on the gear reducer 106, the cover 110 is bolted to the casing 102, and the motor 112 is installed and bolted to the cover 110. Accordingly, the gear reducer installation is complete.

It is reiterated that the apparatus 122 is described above with reference to an exemplary embodiment where a gear reducer 106 is being removed from one joint 101 of a Fanuc robot 100. It will be appreciated by those skilled in the art, however, that several modifications can be made to the disclosed apparatus while remaining within the spirit of the disclosure.

One example of a modification concerns the structure of the bracket 124. The bracket can be configured to have many different shapes while positioning a sleeve for supporting a guide bearing in a position that is spaced from and aligned with the gear reducer installed in the robot. For example, the bracket can be attached to parts of the robot other than those explicitly disclosed above, though the bracket is advantageously attached to existing structures of the robot, such as the existing bolt openings.

With reference to the attachment structures, the disclosure herein focuses on attachment via bolting. However, any other attachment mechanism can be utilized. Again, it may be advantageous if any components of the apparatus that are to be attached to the assembly holding the gear reducer are attached to the assembly via existing attachment structures.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An apparatus for replacing a robot gear reducer mounted in a robot casing, comprising:
    a bracket adapted to be attached to the robot casing;
    a sleeve disposed on the bracket so as to be spaced from and aligned with the gear reducer when the bracket is attached to the robot casing;
    a guide bearing slidably received in the sleeve; and
    a mounting plate for attaching a first end of the guide bearing to the gear reducer, the mounting plate comprising: a planar body; a guide bearing securing portion for attaching to the first end of the guide bearing, the guide bearing securing portion configured to removably attach to the first end of the guide bearing; and a gear reducer securing portion adapted to be bolted to the gear reducer,
    wherein the mounting plate guide bearing securing portion is a circular opening with a spacer projecting therefrom, wherein the opening and the spacer cooperate to define a threaded inner surface, and wherein the guide bearing first end is threaded so as to threadedly engage the threaded inner surface of the opening and the spacer of the mounting plate.

2. The apparatus according to claim 1, wherein the bracket is adapted to be bolted to the robot casing using existing bolt receiving opening provided in the robot casing.

3. The apparatus according to claim 1, wherein the sleeve defines a passage for slidably receiving the guide bearing that is aligned with the gear reducer when the bracket is attached to the robot casing.

4. The apparatus according to claim 1, wherein the mounting plate gear reducer securing portion comprises a plurality of mounting plate bolt openings, each of which is alignable with an existing bolt opening formed in the gear reducer when the mounting plate is attached to the guide bearing first end, such that the mounting plate is boltable to the gear reducer.

5. The apparatus according to claim 1, wherein the mounting plate gear reducer securing portion comprises a plurality of mounting plate bolt openings that are alignable with an existing bolt opening formed in the gear reducer when the mounting plate is attached to the guide bearing first end, such that the mounting plate is boltable to the gear reducer.

6. The apparatus according to claim 5, wherein a first face of the mounting plate is attached to the first end of the guide bearing and a second face of the mounting plate is attached to the gear reducer.

7. The apparatus according to claim 1, wherein the sleeve includes an inner surface that defines an opening that is aligned with the gear reducer when the bracket is attached to the robot casing, and the guide bearing and the inner surface of the sleeve have circular cross sections, with the radius of the guide bearing first end and a guide bearing main body being less than the radius of the inner surface of the sleeve.

8. The apparatus according to claim 1, further comprising a hanging assembly for supporting the gear reducer from the bracket.

9. An apparatus for replacing a robot gear reducer mounted in a robot casing, comprising:
    a bracket adapted to be attached to the robot casing;
    a sleeve disposed on the bracket so as to be spaced from and aligned with the gear reducer when the bracket is attached to the robot casing;
    a guide bearing slidably received in the sleeve;
    a mounting plate for attaching a first end of the guide bearing to the gear reducer, the mounting plate comprising: a guide bearing securing portion for attaching to the first end of the guide bearing; and a gear reducer securing portion adapted to be bolted to the gear reducer; and
    a hanging assembly for supporting the gear reducer from the bracket,
    wherein the hanging assembly comprises a lift ratchet connected to the bracket and the gear reducer, wherein the lift ratchet is operable to raise and lower the gear reducer.

10. The apparatus according to claim 9, wherein the mounting plate further comprises a planar body, and the guide bearing securing portion is configured to removably attach to the first end of the guide bearing.

11. The apparatus according to claim 10, wherein the mounting plate guide bearing securing portion is a circular opening with a spacer projecting therefrom, wherein the opening and the spacer cooperate to define a threaded inner surface, and wherein the guide bearing first end is threaded so as to threadedly engage the threaded inner surface of the opening and the spacer of the mounting plate.

12. The apparatus according to claim 9, wherein the hanging assembly further comprises a yolk that is attachable to existing bolt openings provided in the gear reducer, wherein the lift ratchet engages the yolk and thereby supports the gear reducer.

13. The apparatus according to claim 9, wherein the bracket is adapted to be bolted to the robot casing using existing bolt receiving opening provided in the robot casing.

14. The apparatus according to claim 9, wherein the sleeve defines a passage for slidably receiving the guide bearing that is aligned with the gear reducer when the bracket is attached to the robot casing.

15. An apparatus for replacing a robot gear reducer mounted in a robot casing, comprising:
 a bracket comprising: a principal support arm adapted to be attached to the robot casing; a gear reducer support arm extending from the principal support arm and adapted to support a hanging assembly for supporting the gear reducer; and a guide bearing support arm extending from the gear reducer support arm at a position spaced from the principal support arm;
 a sleeve provided in the guide bearing support arm and disposed on the bracket so as to be spaced from and aligned with the gear reducer when the bracket is attached to the robot casing;
 a guide bearing slidably received in the sleeve; and
 an attachment member for attaching a first end of the guide bearing to the gear reducer.

16. The apparatus according to claim 15, wherein the bracket further comprises an auxiliary support arm which extends from the guide bearing support arm and has a distal end adapted to be attached to the robot casing.

17. The apparatus according to claim 15, wherein the gear reducer support arm perpendicularly extends from the principal support arm, and the guide bearing support arm perpendicularly extends from the gear reducer support arm.

18. The apparatus according to claim 15, wherein the hanging assembly comprises:
 an eye bolt provided on the gear reducer support arm;
 a lift ratchet attached to the eye bolt; and
 a yolk attachable to the gear reducer and attached to the lift ratchet,
 wherein the lift ratchet is operable to raise and lower the gear reducer relative to the bracket.

19. A method for removing a gear reducer mounted in a robot casing, comprising:
 attaching a bracket to the robot casing such that a sleeve disposed on the bracket is aligned with and spaced from the gear reducer mounted in the robot casing;
 sliding a guide bearing into the sleeve toward the gear reducer;
 attaching a mounting plate to a first end of the guide bearing;
 attaching the mounting plate to the gear reducer;
 sliding the guide bearing away from the robot casing so as to remove the gear reducer;
 attaching the gear reducer to a hanging assembly that is attached to the bracket;
 detaching the mounting plate from the gear reducer; and
 lowering the gear reducer using the hanging assembly.

20. The method according to claim 19, wherein the bracket is attached to the robot casing by bolting to existing bolt receiving openings provided in the robot casing and the mounting plate is attached to the gear reducer by bolting to existing bolt receiving openings provided in the gear reducer.

21. A method for mounting a pear reducer into a robot casting, comprising:
 attaching a bracket to the robot casing such that a sleeve provided by the bracket is aligned with and spaced from the gear reducer mounted in the robot casing;
 attaching a mounting plate to a first end of a guide bearing received through the sleeve of the bracket;
 attaching the gear reducer to a hanging assembly that is attached to the bracket;
 raising the gear reducer using the hanging assembly until the gear reducer is adjacent to the sleeve;
 attaching the mounting plate to the gear reducer;
 sliding the guide bearing toward the robot casing to install the gear reducer; and
 detaching the mounting plate from the gear reducer.

22. The method according to claim 21, wherein the bracket is attached to the robot casing by bolting to existing bolt receiving openings provided in the robot casing and the mounting plate is attached to the gear reducer by bolting to existing bolt receiving openings provided in the gear reducer.

* * * * *